J. A. DUKE.
VEHICLE BRAKE.
APPLICATION FILED MAY 16, 1913.
1,134,597.
Patented Apr. 6, 1915.
2 SHEETS—SHEET 1.
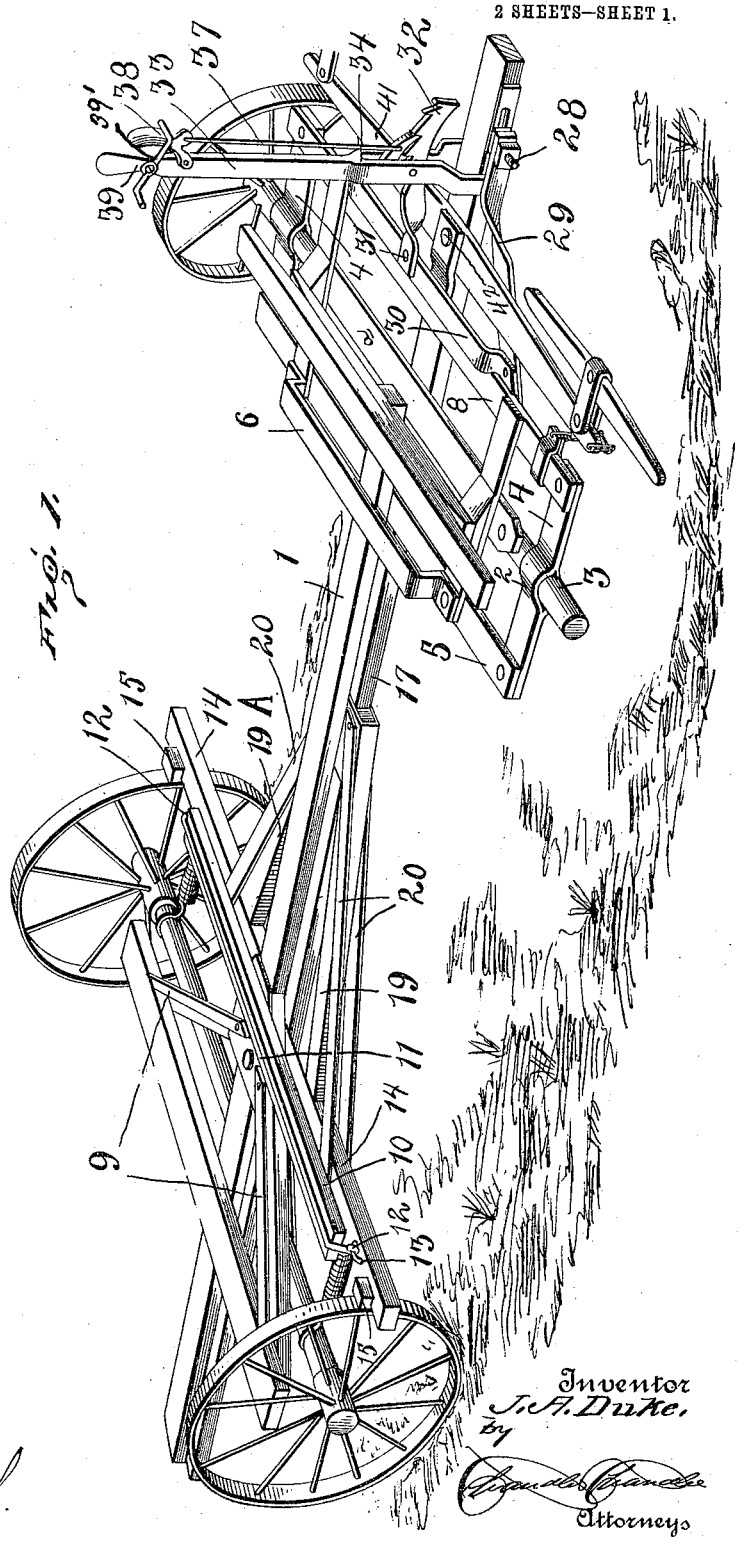
Witnesses
Robert F. Beck
R. B. Cavanaugh
Inventor
J. A. Duke,
by
Attorneys

J. A. DUKE.
VEHICLE BRAKE.
APPLICATION FILED MAY 16, 1913.

1,134,597.

Patented Apr. 6, 1915.
2 SHEETS—SHEET 2.

Witnesses
Robert T. Bek
R. J. Cavanagh

Inventor
J. A. Duke
By Chandler & Chandler
Attorneys

UNITED STATES PATENT OFFICE.

JOSEPH A. DUKE, OF TOGO, ARKANSAS, ASSIGNOR OF ONE-SIXTH TO MACK STACY, OF WYNNE, ARKANSAS.

VEHICLE-BRAKE.

1,134,597.  Specification of Letters Patent.  Patented Apr. 6, 1915.

Application filed May 16, 1913. Serial No. 768,131.

*To all whom it may concern:*

Be it known that I, JOSEPH A. DUKE, a citizen of the United States, residing at Togo, in the county of Cross, State of Arkansas, have invented certain new and useful Improvements in Vehicle-Brakes; and I do hereby declare the following to be a full, clear, and exact description of the invention, such as will enable others skilled in the art to which it appertains to make and use the same.

The present invention relates to certain novel and useful improvements in automatic vehicle brakes.

In carrying out my invention it is my purpose to provide a brake which will be applied when the pull on the tongue of the vehicle is released. Thus when the vehicle is descending an incline and moves forward on the draft animals, the brake will be automatically applied and will likewise be set when the vehicle is brought to a stop and the pulling stress ceases. Furthermore, after the brake has been set it will be released when the draft animals are started ahead.

With the above recited objects and others of a similar nature in view, my invention consists in the construction, combination and arrangement of parts set forth in and falling within the scope of the appended claims.

Figure 3:
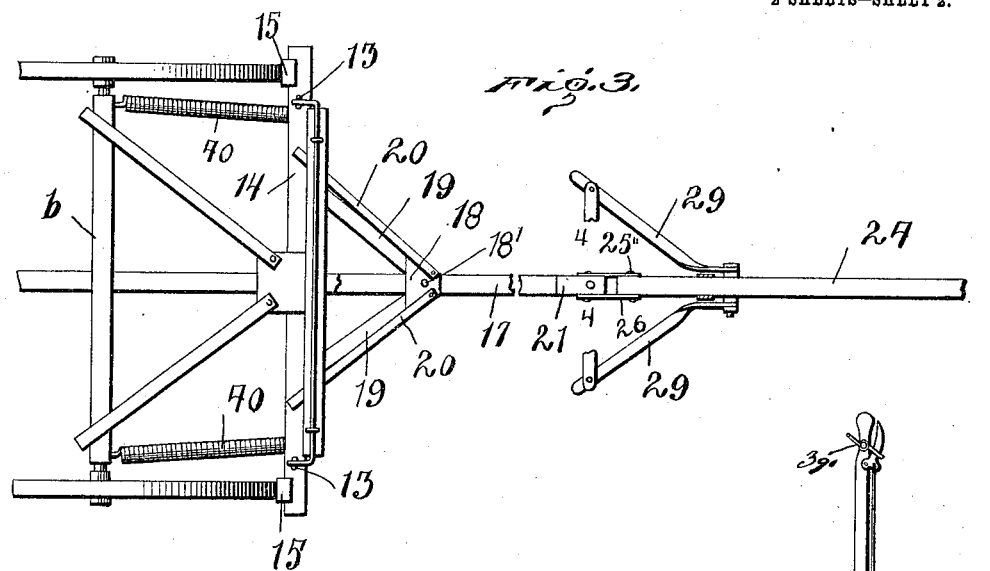
Figure 2:
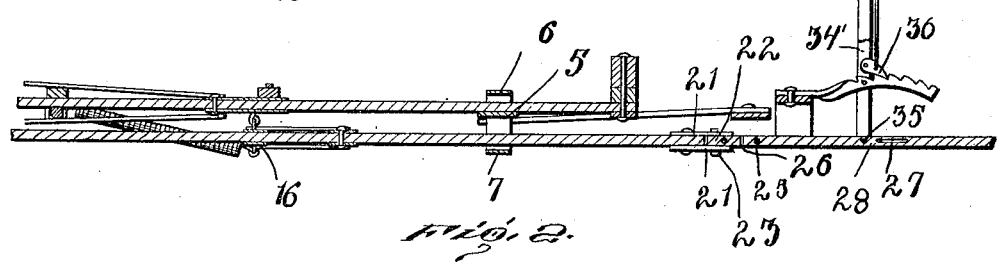
Figure 4:
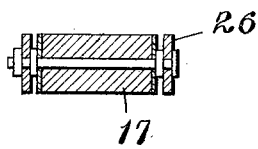

In the accompanying drawings: Figure 1 is a perspective view of a running gear of a vehicle equipped with my improved brake. Fig. 2 is a longitudinal sectional view taken through a portion of the same. Fig. 3 is a top plan view of the supplemental reach carrying the brake bars and showing the connection of such reach with the wagon. Fig. 4 is a cross sectional view taken on the line 4—4 of Fig. 3.

Referring now to the accompanying drawings in detail, the letter A indicates the running gear as an entirety which embraces the main reach 1, at the forward end of which is the front axle supporting frame 2, while 3 indicates the front axle journaled in the cross bars 4. This frame is provided with a rear bar 5 carrying the top bracket 6 and the bottom bracket 7. The axle frame also includes a front bar 8. The main reach 1 extends rearward between the top brackets 6 and the bar 5 and at its rear end is provided with the usual rear hounds 9. Directly forward of the front ends of the hounds, the main reach carries a cross bar 10 which supports a rocking hanger rod 11 having the downwardly turned hook ends 12 engaging with the staples 13 driven into the brake bar 14, the latter carrying the brake shoes 15 which are designed to engage the rear wheels of the vehicle. This brake bar 14 is centrally slotted as at 16 so that the supplemental reach bar 17 may slide loosely therethrough. This reach bar also has secured thereto the slotted head 18 which is connected by the brace arms 19 and the inclined brace arms 20 to the brake bar 14. The supplemental reach 17 extends forwardly through the space between the lower brackets 7 and the bar 5, and beneath the front axle bar *a* and at its forward end, carries a pair of spaced plates 21 between which is held a block 22 by means of the bolt 23. To this block is pivoted the tongue 24 by means of the bolt 25 which passes through the block and through the spaced plates 26 carried at the rear end of the tongue. Forward of its point of connection with the block, the tongue is formed with a longitudinal slot 27 in which slides a bolt 28 connected through the brace arms 29 with the front cross bar 8 of the axle frame. These bars 29 are connected at their rear end portions by means of the cross strip 30 and fastened to the central portion of this cross strip as at 31, is a toothed segment rack 32 which extends forward over the tongue, the teeth projecting toward the rear or secured end of the rack. A lever 33 is pivoted to the rack 32 and is provided with a bifurcated head 34 which spans the rack and tongue and is pivotally connected with the latter through the bolt 35. Between the bifurcated sections of the head is pivoted a dog 36 designed to engage the teeth of the rack 32, this dog being provided with the usual operating rod 37, the upper end of which is connected to the grip 38 pivoted to the handle section 39 of the lever 33.

The brake bar 14 is connected adjacent its ends with the rear axle *b* of the vehicle by means of two relatively heavy powerful coil springs 40 so that the tendency of the springs is normally to draw the bar rearward to bring the brake shoe 15 into braking engagement with the rear wheels. And this will take place whenever the forward strain or pull of the draft animals on the tongue of the wagon is released, for it will be noted that the double tree 41 is pivotally connected by the bolt 42 to the rear end of the tongue and as the brake bar is connected to the head 18, and the latter is in turn bolted to the supplemental reach 17 by means of the bolt 18', the reach will be drawn rearward under the action of the springs and pull the tongue slightly rearward with it, this being permitted by the pin 28 working in the slot 27. When, however, the draft animals pull forward on the double tree and consequently the tongue the pin 28 will move to the rear end of the slot, as shown in Fig. 2, and the reach 17 will pull forward, thus drawing the brake bar and consequently the brake shoes away from the rear wheels against the action of the springs 40. The catch 39' locks the grip 38 to handle 39.

If for any reason it be desired to lock the brake out of operation, this may be accomplished by the driver swinging the lever 33 and operating the grip 38 in the usual manner to hold the tongue against longitudinal or sliding movement.

It will be noted that the supplemental reach is guided when shifted longitudinally by the cross bar 5 and the lower bracket 7 carried thereby, so that the reach and the connected parts will at all times travel in proper alinement.

It will be seen that I have provided an exceedingly simple, yet efficient type of automatic vehicle brake, which is especially adapted for heavy vehicles, such as farm wagons and the like, and while I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claims.

What I claim is:

1. The combination of a running gear, a sliding reach therefor, a brake bar fulcrumed on the running gear and connected with the sliding reach, brake shoes carried by said bar, means normally tending to draw said brake shoes into braking relation with the rear wheels of the running gear, a tongue connected with the forward end of the reach and having a slot formed therein, a draft attachment pivoted to the rear of said tongue, a bolt passing through said slot, brace members connecting said bolt in supported relation with the body of the running gear, a toothed rack supported above the rear end of the tongue, a lever fulcrumed on said tongue and a locking pawl for said lever adapted to engage with the teeth of the rack.

2. The combination with a running gear, of a brake bar fulcrumed on the running gear, brake shoes carried by said bar, springs extending between the brake bar and the rear axle of the running gear and normally drawing said shoes in braking relation to the rear wheels of the running gear, a sliding reach extending longitudinally of the running gear, a head block fastened to said reach, brace bars connecting the head block with the brake beam, a tongue, a draft attachment connected with the tongue, a swivel connection between the rear end of the tongue and the forward end of the sliding reach, said tongue having an elongated slot therein, a bolt sliding in said slot, brace bars connecting said bolt in supported relation with the body of the running gear, a cross strap connecting said brace bars, a toothed rack carried by said cross strap, a lever pivoted to the tongue at a point between the slot thereof and the connection of the tongue with the reach, and a locking pawl carried by the reach and adapted to engage with the rack.

In testimony whereof, I affix my signature, in the presence of two witnesses.

JOSEPH A. DUKE.

Witnesses:
F. S. WINFORD,
H. L. CALDREN.

Copies of this patent may be obtained for five cents each, by addressing the "Commissioner of Patents, Washington, D. C."